UNITED STATES PATENT OFFICE.

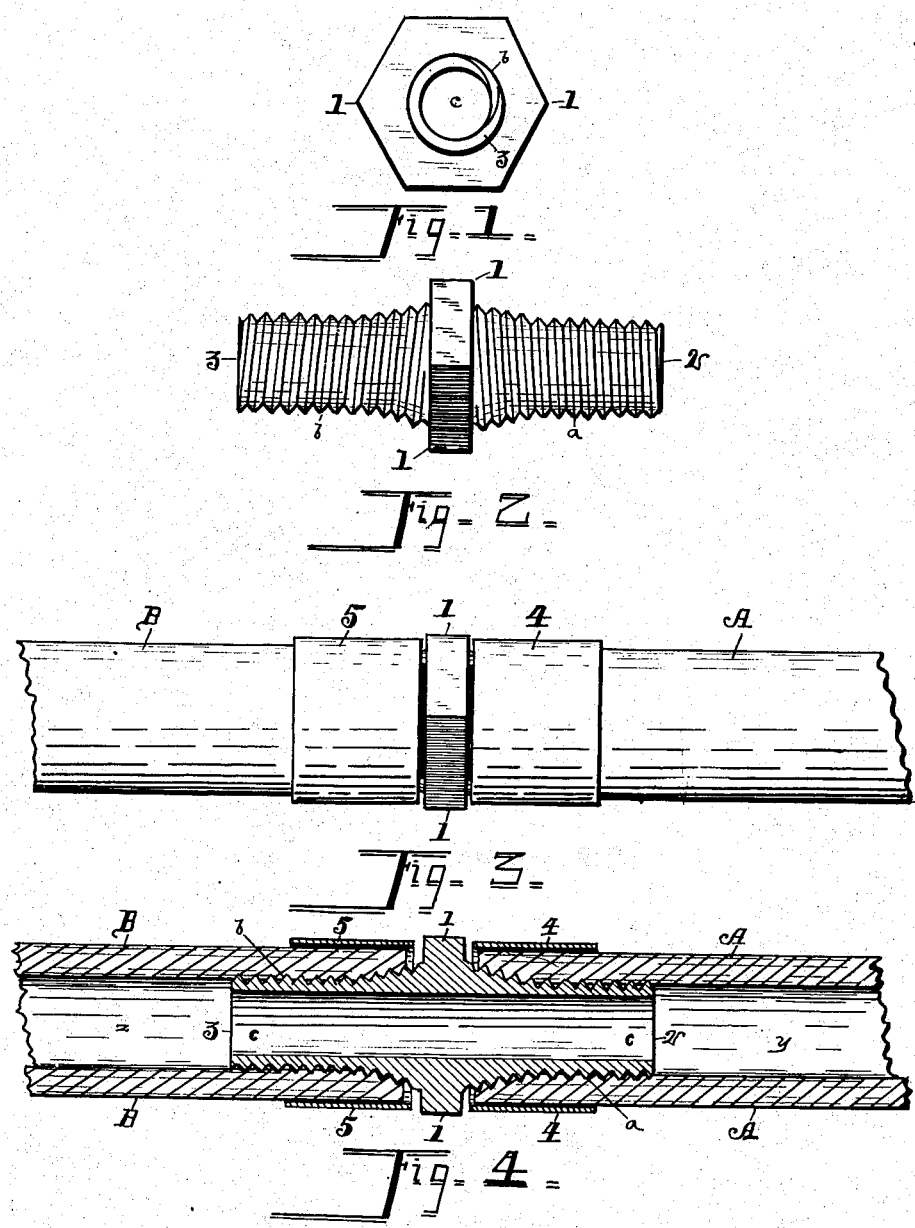

WILFRED B. WARD, OF RICHMOND, INDIANA, ASSIGNOR OF ONE-HALF TO WILLIAM C. FERGUSON, OF RICHMOND, INDIANA.

HOSE-COUPLING.

No. 815,990.  Specification of Letters Patent.  Patented March 27, 1906.

Application filed July 22, 1904. Serial No. 217,611.

*To all whom it may concern:*

Be it known that I, WILFRED B. WARD, a citizen of the United States, residing in the city of Richmond, in the county of Wayne, and in the State of Indiana, have invented new and useful Improvements in Hose-Couplings, of which the following is a full, clear, and complete exposition, such as will enable others familiar with the art to which this invention relates to make and use the same.

My present invention, broadly speaking, has reference to a new and useful article of manufacture—a hose-coupling for expeditiously connecting the ends of hose or pipes, whereby a plurality of sections may be joined together to provide an aqueduct of the desired length.

One of the objects I have in view is the provision of a hose-coupling adapted for quickly and securely connecting the ends of rubber hose, whereby the general contour of the hose will not be disturbed by large and unsightly joints, but will present a uniformly neat and mechanically perfect appearance.

A further object is to provide a hose-coupling which will be simple in character, positive in action and adjustment, easily connected and disconnected, and which can be made and sold at a comparatively low price.

A still further object is the provision of a new article of manufacture—a hose-coupling particularly intended for connecting the abutting ends of rubber hose, but which may also be employed for uniting the ends of lead pipe or for uniting pipes or the like of other materials, and, finally, a further object is to provide a simple and practical coupling for connecting and forming water-tight joints in fluid-transmitting pipes, which may be easily and quickly manipulated without the use of tools and which will not mar the uniformity of the pipe or impede the flow of fluids therethrough.

Other objects and advantages of this invention will be made apparent in the course of the ensuing specification and suggested by an inspection of the accompanying drawings.

This invention consists particularly in a hose-coupling embodying new and useful features and details of construction and the relative disposition of the various contributing elements, substantially as herein shown and described.

The preferred manner for the construction of my invention is shown most clearly in the accompanying drawings, in which—

Figure 1 is an end view of my invention. Fig. 2 is a side elevation of the essential part of my invention detached. Fig. 3 is a side elevation showing my invention as employed in its intended purpose of connecting the abutting ends of two sections of hose or pipes, and Fig. 4 is a vertical longitudinal central section taken through all the parts shown in Fig. 3 and providing an introspective view of the invention.

In the drawings similar indices denote and refer to like parts throughout the several views.

Referring now to the drawings in detail, I will take up the description of my invention and will describe the various parts and their operations as briefly and compactly as I may.

My invention consists, essentially, of the integral core, (shown in full in Fig. 2,) and it consists of the respective right and left hand nipples 2 and 3, which are integrally connected by the central flange 1.

The nipples 2 and 3 are identical in form and construction, each being cylindrical, with the greater portion of their peripheries longitudinal, parallel with the axial line of the core, and then swelling slightly outward and connecting with the flange 1 at an angle, substantially as shown. Commencing at their outer termini the peripheries of the nipples have formed therearound a number of convolutions of spiral grooves or V-threads $a$ and $b$, respectively, which threads extend over said swelled portions of the nipples to or near the respective sides of the flange 1, substantially as shown. The peripherical edge of the flange 1 should rise somewhat from the plane of the peripheries of the nipples 2 and 3, and this edge of the flange may be formed circular in contour, with its peripheral edge knurled, if desired; but I prefer to form the edge polygonal, or more particularly hexagonal, which will provide a gripping-surface either for the hand or for a wrench, if required. Extending in an axial direction through the core, as described, is a smooth-bore channel (designated by the letter $c$,) which forms the passage-way for the fluid which may pass therethrough when the hose are connected.

The letters A and B denote each the right and left sections, respectively, of the hose connected by my invention. Each of said sections of hose has a central bore, as y and z, respectively, extending in an axial direction therethrough.

The numerals 4 and 5 denote right and left thimbles, which are placed around the peripheries of the opposing ends of the respective hose A and B, and, being held in place by the torsion of the hose, they may be easily removed or replaced.

It is now apparent that the ends of the nipples 2 and 3 may be entered in the interior spaces y and z, respectively, of the respective hose A and B; and then by turning the core or by revolving the hose the end portions of the hose may be caused to travel on the threads of the nipples, thus drawing the ends of the hose near to or in contact with the sides of the flange 1, substantially as shown, and by reason of the threads tightly entering the interior and contacting with the interior walls of the hose, and, further, by reason of the outer walls of the hose being unable to expand by reason of the respective thimbles, it will be apparent that the hose will be very tightly held in place by the threads, and thus forming a point or union of great strength and also providing a waterproof joint of greater resistance than is the resistance of the hose intermediate of or at a distance from one of the joints thus formed.

It is apparent that the thimbles 4 and 5 may, if desired, be dispensed with entirely, yet by their employment the joint is rendered stronger and absolutely impervious to the water-pressure.

From the above it will be seen that by the construction shown and described I have accomplished the objects otherwhere referred to in this specification.

My improvements are perfectly adapted to accomplish the results and objects stated, and it is evident that changes in and modifications of the construction herein shown and described may be made and that analogous parts may be used to accomplish the same results without departing from the spirit of my invention or sacrificing any of its many advantages.

It will be observed that the core is tubular and preferably strictly cylindrical in its interior form, but composed externally of the middle prismatic annular operating flange or shoulder where its diameter is greatest, a pair of reversely-tapering and reversely-screw-threaded cones and cylindrical extensions of the same having the screw-threads thereof extended to their ends. The thimbles or ferrules 4 and 5 do not at all impede the engagement of this core with the hose-sections, but hold the material of the ends of said sections in engagement with the screw-threads and prevent it from bulging outward beside protecting it and guarding against the dislodgment of the core. They also permit ready access of a wrench or spanner to the peripheral part of the said flange or shoulder, which is located in a sufficient space between them, with its angles extending outward slightly beyond them. The core is preferably of a single casting, but of course might be made in several pieces securely joined. The conical form of the parts of the inner core nearest the shoulder facilitates turning the core in to tighten the joint, also turning reversely to uncouple. The ferrules make this construction feasible. The parts of the core beyond the ferrules being cylindrical will not require such aid, since they do not press the hose material outward. Having no taper, they will hold more securely than would be possible for uninclosed expansible tubular hose material.

Having now fully shown and described my invention and the best mode for its construction and use to me known at this time, what I claim as new, and desire to secure by Letters Patent of the United States, is—

1. An integral tubular coupling-core for hose-sections having externally the form of two reversed cones terminating in cylindrical extensions and connected by an intervening prismatic annular flange or shoulder of greater diameter than the bases of said cones, these cones and their cylindrical extensions being screw-threaded in opposite directions to each other substantially as set forth.

2. A pair of hose-sections provided with terminal protecting and binding ferrules open at the end, in combination with a tubular coupling-core screw-threaded from near its middle in opposite directions, consisting of two reversed cones, their extensions and intermediate means for facilitating the turning of the said core substantially as set forth.

In testimony whereof I have hereunto signed my name to this specification in the presence of two subscribing witnesses.

WILFRED B. WARD.

Witnesses:
WM. C. FERGUSON,
K. W. RANDLE.